United States Patent [19]

Ohmori et al.

[11] 4,326,788

[45] Apr. 27, 1982

[54] INFORMATION TRANSMISSION MEANS IN AN INTERMEDIATE LENS TUBE FOR CAMERA

[75] Inventors: Sachio Ohmori, Yokohama; Kunihiro Fukino, Kawasaki; Sunao Ishizaka, Tokyo, all of Japan

[73] Assignee: Nippon Kogaku K.K., Tokyo, Japan

[21] Appl. No.: 256,135

[22] Filed: Apr. 21, 1981

[30] Foreign Application Priority Data

Apr. 23, 1980 [JP] Japan .................................. 55/53951

[51] Int. Cl.³ .............................................. G03B 17/14
[52] U.S. Cl. ...................................... 354/286; 354/46; 354/270
[58] Field of Search ................. 354/286, 46, 295, 197, 354/270, 271, 191; 350/252, 257

[56] References Cited

U.S. PATENT DOCUMENTS 3,683,765  8/1972  Iura ........................................ 354/46
4,003,068  1/1977  Hashimoto et al. ................ 354/286

Primary Examiner—John Gonzales
Attorney, Agent, or Firm—Fitzpatrick, Cella, Harper & Scinto

[57] ABSTRACT

An intermediate lens tube to be mounted between an interchangeable lens and a camera body is provided with means for transmitting an information signal from the interchangeable lens to the camera body. Said information transmission means includes correction means for transmitting a corrected information signal to the camera body only when vignetting takes place in the intermediate lens tube.

6 Claims, 3 Drawing Figures

INFORMATION TRANSMISSION MEANS IN AN INTERMEDIATE LENS TUBE FOR CAMERA

BACKGROUND OF THE INVENTION

1. Field of the Invention

The present invention relates to information transmission means in an intermediate lens tube to be mounted between an interchangeable lens and a camera body. Said information transmission means serves to transmit an information signal from the interchangeable lens to the camera body when they are joined together.

2. Description of the Prior Art

When an intermediate lens tube is mounted between an interchangeable lens and a camera body, there occurs sometimes a vignetting phenomenon. By this phenomenon the bundle of light rays coming from the exit pupil of the interchangeable lens is vignetted. Such vignetting is caused by the intermediate lens tube case by case. In case that the intermediate lens tube is mounted between an interchangeable lens having a relatively large minimum F-number (which generally means a small lens aperture) and a camera body, it is seldom that vignetting is caused by the lens tube. However, in the case of interchangeable lenses having a relatively small minimum F-number (large in lens aperture), the lens tube is apt to cause vignetting. In this manner, for one and the same intermediate lens tube, it is a case by case question as to whether vignetting takes place or not, depending on the minimum F-number of the interchangeable lens with which the intermediated lens tube is connected. Considering many combinations of the same intermediate lens tube and various interchangeable lenses, it is possible preliminarily to determine a critical minimum F-number in respect of the occurrence of vignetting.

If an interchangeable lens having a smaller minimum F-number than such critical minimum F-number is connected to the intermediate lens tube, then a part of the exit light from the interchangeable lens, with its aperture being at or near its minimum F-number, will be blocked by the lens tube and therefore the quantity of photographing light reaching the focal plane in the camera will be substantially reduced as compared with the quantity of light passed through the diaphragm of the interchangeable lens.

On the other hand there is known in the art such interchangeable lens which has means for generating a signal informing of its minimum F-number. Such signal generating means is provided on the mount of the interchangeable lens. This F-number information signal is introduced into the exposure control part of the camera, for example, into an exposure meter, shutter speed priority automatic exposure control apparatus or programmed automatic exposure control apparatus. The input signal is processed in the exposure control part of the camera. Therefore, as readily understood, when the above mentioned interchangeable lens and intermediate lens tube are mounted in front of a camera provided with the above exposure control apparatus, the reduction of quantity of light caused by vignetting should be taken into consideration. Otherwise, maloperation of exposure control may be caused thereby.

For example, we can mention the case where the diaphragm of the interchangeable lens is controlled from the side of camera body when a picture is taken employing a combination of the above intermediate lens tube and interchangeable lens. In this case, although the control itself may be performed correctly, the information of diaphragm value then indicated in the finder of the camera can not be correct but show the operator incorrect information.

The same may be said of programmed control. In the case of programmed control, the combination of shutter speed and aperture value is selected and controlled in accordance with a predetermined program considering the change in luminance of an object. If above mentioned vignetting takes place, then the control will be carried out in accordance with a program shifted from the predetermined control program to the extent corresponding to the magnitude of vignetting. This shift generally occurs in the direction toward the side of low shutter speed. This is disadvantageous in particular when a known rear conversion lens is used as the intermediate lens tube. The rear conversion lens includes an optical system for converting focal length. Since the focal length is lengthened by the rear conversion lens, it becomes difficult to hold the camera stably at the time of picture taking. A stable holding of the camera may be possible so long as the shutter speed set at that time is relatively high. However, at a low shutter speed, the holding of camera is apt to be unstable. In this sense, the shift of exposure control program toward the side of low shutter speed is undesirable.

SUMMARY OF THE INVENTION

Accordingly it is an object of the invention to provide an information transmission device in an intermediate lens tube of the above mentioned type which is able to correctly transmit information of the minimum F-number of the interchangeable lens to the camera body while taking into account the adverse effect of vignetting which may occur when the interchangeable lens is connected to the intermediate lens tube.

To attain the above and other objects according to the present invention there is provided an intermediate lens tube having information transmission device of high reliability. The intermediate lens tube is intended to be mounted between an interchangeable lens provided with means for generating an information signal informing of the minimum F-number of the lens formed on its own mount and a camera body provided with means for detecting said information signal formed on the camera body. When the intermediate lens tube is mounted between such interchangeable lens and camera body, said transmission means of the intermediate lens tube is connected with said information signal generating means on one side and with said detection means on the other side to transmit the information signal from the interchangeable lens to the camera body. Said transmission means includes correction means. When an interchangeable lens having a smaller minimum F-number than a predetermined critical minimum F-number is connected to the intermediate lens tube so that vignetting is caused thereby, said correction means transmits to said detection means not the minimum F-number signal given by said signal generating means but another signal corresponding to the critical minimum F-number.

Other and further objects, features and advantages of the invention will appear more fully from a reading of the following detailed description.

DESCRIPTION OF PREFERRED EMBODIMENTS

The present invention is described in detail with reference to preferred embodiments thereof in which the invention is applied to a rear conversion lens as an intermediate lens tube.

Figure 1:
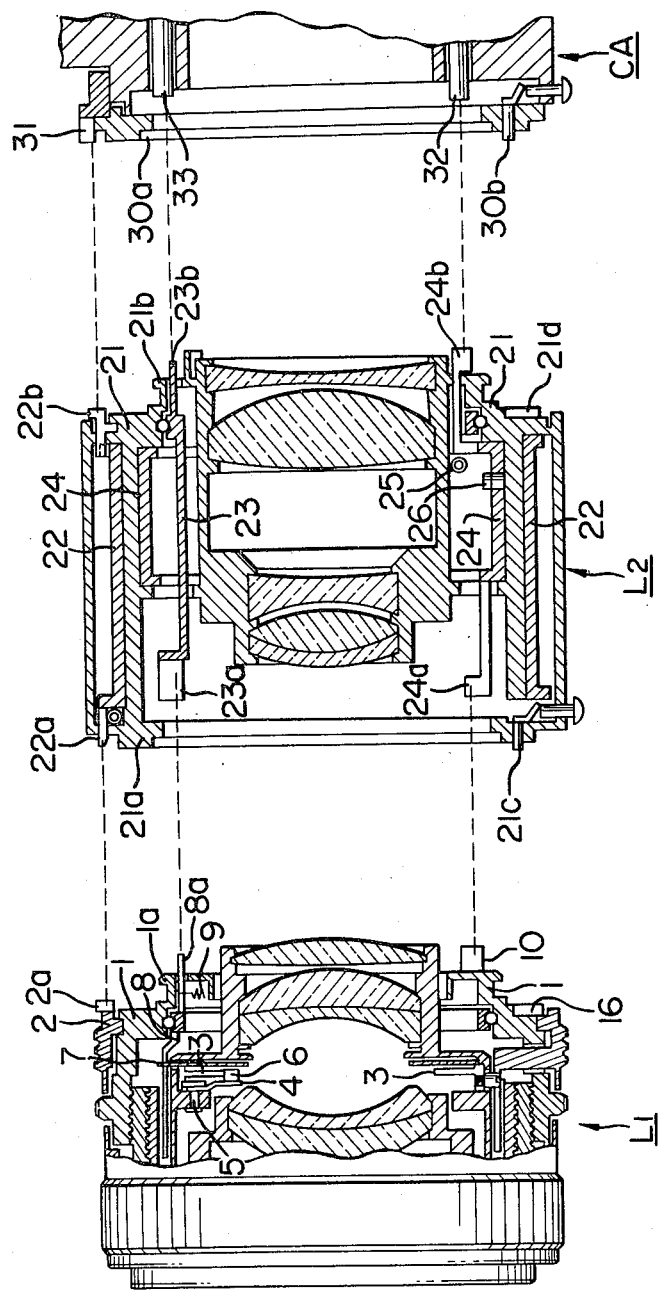
FIG. 1 is a schematic sectional view of an embodiment of the invention illustrating the relation between an intermediate lens tube in which the present invention is applied and interchangeable lens and camera body between which the lens tube is to be mounted.

In FIG. 1, reference character L1 designates an interchangeable lens, L2 a rear conversion lens and CA a camera body.

The interchangeable lens L1 has a stationary tube 1, a preset diaphragm ring 2, a cam ring 3 and a diaphragm driving ring 7. The stationary tube 1 has a male bayonet mount 1a formed integrally with the tube 1. The diaphragm ring 2 is rotatably supported by the stationary tube 1 and has a first signal member 2a fixed to the ring. Designated by 10 is a second signal member fixed to the bayonet mount 1a.

The function of the first signal member 2a is to produce information of diaphragm step number as a change of its position in the circumferential direction. The step number of diaphragm corresponds to the difference between the minimum F-number of interchangeable lens L1 and the diaphragm value then preset. The information of diaphragm step number given by the first signal member 2a is referred to hereinafter as step number signal. The function of the second signal member 10 is to produce a minimum F-number signal corresponding to the minimum F-number of the interchangeable lens then mounted. The signal is given as a circumferential displacement of the signal member from a reference position predetermined on the mount 1a.

The stationary tube 1 has also a positioning reference slot 1b. The diaphragm driving ring 7 is rotatable about the optical axis to drive the diaphragm blade in the manner known per se. The cam ring 3 rotates together with the diaphragm ring 2. The cam ring has a cam surface formed in its inner circumferential surface. A pin 6 is in contact with the cam surface. The pin 6 is fixed to a lever 4 which is in turn mounted on an axis 5 for rotation about the axis. These members including the lever 4 constitute a known diaphragm setting mechanism to limit the rotation of the diaphragm driving ring 7. The lens L7 further includes an automatic stop-down lever 8 mounted swing movably to rotate the diaphragm driving ring 7. The ring 7 is moved together with the lever 8 in link with a shutter releasing operation on the camera body when a picture is taken.

The rear conversion lens L2 includes a lens group by which the focal length of the interchangeable lens L1 is changed by two times, three times or so on. The rear conversion lens L2 has a base member 21 provided with a female bayonet mount 21a and a male bayonet mount 21b. The female bayonet mount 21a cooperates with the above mentioned male bayonet mount 1a of the interchangeable lens L1 to connect the latter with L2. On the rear conversion lens 12 there are provided also a first signal transmission member 22 and a second signal transmission member 24. The first transmission member 22 is supported rotatably about the optical axis and has two terminals 22a and 22b. The change in position (namely, angle of rotation) of the above mentioned first signal member 2a is received by the input terminal 22a. The received change in position is put out from the output terminal 22b of the transmission member 22.

The second transmission member 24 is supported also rotatably about the optical axis and has two terminals 24a and 24b. The change in position (namely, circumferential displacement) of the above mentioned second signal member 10 is received by the input terminal 24a. The received change in position is put out from the output terminal 24b of the second transmission member 24. The second transmission member 24 is normally biased in the circumferential direction by a spring 25 and the rotation range of the transmission member 24 is limited by a stopper pin 26.

The rear conversion lens L2 further includes an interlocking member 23 supported on the base member also rotatably about the optical axis. The interlocking member has a terminal 23a through which the member 23 is engageable with the end portion 8a of the above mentioned automatic stop-down lever 8. Further, the base member 21 has a slide pin 21c engageable with the reference slot 1b and a reference slot 21d engageable with a pin provided on the camera body as described later.

The camera body CA has a female bayonet mount 30a, a first detection member 31, a second detection member 32 and a diaphragm driving member 33. The female bayonet mount 30a is connectable with the above mentioned bayonet mount 1a or 21b. The first detection member 31 is engageable with the first signal member 2a or the output terminal 22b of the first signal transmission member 22 so as to move together with the signal member or transmission member and to thereby receive the step number signal from it.

The second detection member 32 is engageable with the second signal member 10 or the output terminal 24b of the second signal transmission member 24 to detect the positional signal given by the member 10 or 24. The diaphragm driving member 33 is engageable with the end portion 8a of the automatic stop-down lever or the terminal 23b of the interlocking member. When the shutter is released, the member 33 is moved to drive the diaphragm blade in the direction of the aperture being stopped down. Designated by 30a is a slide pin which is engageable with the above mentioned reference slot 1b or 21d.

The rear conversion lens L2 is connected with the camera body CA through the bayonet mount 21b and the interchangeable lens L1 is connected with the lens L2 through the bayonet mount 1a. When the interchangeable lens L1 and the rear conversion lens L2 are joined together, a determined angle of relative rotation takes place between the bayonet mounts 1a and 21a. As a result of this relative rotation, the second signal member 10 makes the second transmission member 24 rotate about the optical axis in a certain amount of angular distance proper to the minimum F-number of the interchangeable lens L1.

Figure 2:
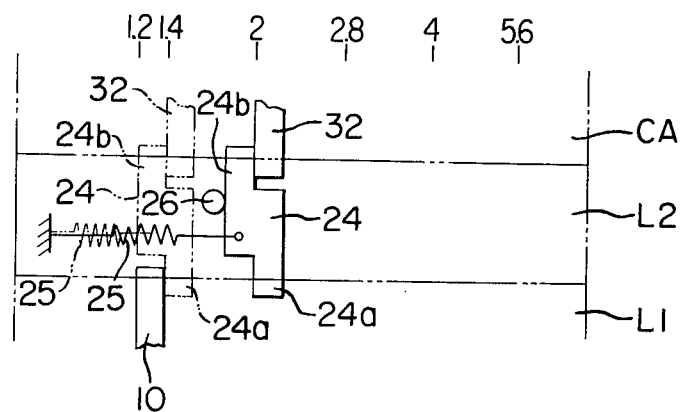
FIG. 2 is a partial exploded view of the embodiment illustrating the manner of operation thereof.

For the purpose of explanation, let the minimum F-number of the interchangeable lens L1 be F 1.4. Then, the signal member 10 has an information signal (displacement) corresponding to F 1.4. FIG. 2 illustrates how to transmit the information signal to the second detection member 32 of the camera body.

So long as the combination of L1 and L2 then used does not cause any vignetting, the information signal of minimum F-number can be transmitted as it is. In this case, the second signal transmission member 24 is controlled as suggested by phantom line (two-dotted chain line) in FIG. 2. By controlling the second transmission member in this manner, the information of minimum F-number actually resulting from the combination of two lenses L1 and L2 can be transmitted to the camera body as a signal. However, in this case, change of minimum F-number due to the focal length converting action of the rear conversion lens L2 is ignored.

More particularly, the signal is transmitted in the following manner:

During the connecting operation of lens L1, lens L2 and camera CA, the second signal member 10 is moved from the right-hand end to the position indicative of F 1.4 in FIG. 2. Under the action of spring 25, the second transmission member 24 follows the signal member 10 and moves to the position indicated by the phantom line. Also, under the biasing force of a spring not shown, the detection member 32 on the camera follows the terminal 24b of the transmission member 24. Thus, the signal informing of the minimum F-number of the interchangeable lens is transmitted to the camera.

The information signal of minimum F-number introduced into the camera is processed as will be described hereinafter.

The exposure control apparatus in the camera may be of automatic exposure control type as disclosed in U.S. Pat. No. 4,204,755. We will discuss the manner of signal processing with reference to two types of automatic exposure control, that is, (1) shutter speed priority automatic exposure control by instantaneous stop-down photometering and (2) programmed automatic exposure control by the same photometering. In either case, the diaphragm driving 7 should be released from the cam ring 3 by setting the preset diaphragm ring 2 of the lens to the position of minimum F-number prior to taking a picture.

(I) Shutter speed priority automatic exposure control by instantaneous stop-down photometering:

From the known Apex arithmetic operation formula $$Tv + Av = Bv + Sv \quad (1)$$

wherein,
Tv is time value,
Av is aperture value,
Bv is luminance value of object and
Sv is ASA speed value.

Also, when the object light passed through the interchangeable lens and rear conversion lens is received by photo receptor elements in TTL metering, the output Bvo then obtainable is given by $$Bvo = Bv - Avo \quad (2)$$

wherein, Avo is effective F-number of the whole system after joining the interchangeable lens and rear conversion lens together into a unit.

From the above (1) and (2), the proper aperture value Av is:

$$Av = Bvo + Sv - Tv + Avo \quad (3)$$

To calculate the proper aperture value Av responsive to change of the output Bvo from the photo receptor after setting the time value Tv to a desired value, the item Avo in the formula (3) has to be cancelled. The above mentioned information of minimum F-number introduced from the detection member 32 is used to cancel this item Avo.

However, in case that the combination of interchangeable lens L1 and rear conversion lens L2 then used causes a vignetting phenomenon, it is not allowed to control the transmission member 24 in the manner indicated by the phantom line in FIG. 2. If the transmission member 24 is controlled in the same manner as described above, then the information detected by the detection member 32 will no longer correctly correspond to Avo in the formula (3). The aperture value Av calculated therefrom becomes, therefore, not the value obtained from a calculation depending upon the actually existing luminance value Bv of the object but becomes such value as obtained from a calculation depending upon a subtracted value (Bv−Avo·v) wherein Avo·v is reduction due to vignetting. Thus, an incorrect value is obtained which is smaller than the real value. If an aperture value based upon such incorrectly calculated value be indicated in the camera as proper aperture value, the indicated aperture value is meaningless because it corresponds neither to the aperture value indicated on the diaphragm ring of the interchangeable lens nor to the aperture value to be actually controlled by instantaneous stop-down photometering.

In the case of exposure control by instantaneous stop-down photometering, the photo receptor receives rays of object light passed through the diaphragm whose aperture value Av is being moved in the direction of stopping-down by TTL metering. Let the output from the photo receptor be Bve. Then, Bve = Bv − Av. From this and the above formula (1), $$Bve = Tv - Sv \quad (4)$$

Thus, the diaphragm is continuously moved to stop down until the quantity of light reaches the value obtained from Tv and Sv then optionally set. As soon as the above formula (4) is satisfied, the stop-down motion of the diaphragm is stopped electromagnetically. Thereafter, the shutter speed is controlled to the set value. In this manner, the automatic exposure control operates correctly.

(II) Programmed exposure control by instantaneous stop-down photometering:

In this case, factors α and β are determined to perform a predetermined programm as follows:

$$\begin{aligned} Av &= \alpha(Bv + Sv) + \beta \\ &= \alpha(Bvo + Avo + Sv) + \beta \end{aligned} \quad (5)$$

Namely, the aperture value Av is determined depending on the photo receptor output Bve, minimum aperture value Avo and ASA speed value Sv and the determined value Av is indicated. Therefore, also in this case, an incorrect aperture value may be indicated due to vignetting for the same reason as described above with reference to the case of shutter speed priority exposure control although (Bvo+Avo+Sv) is multiplied by a factor α in the formula (5).

As for automatic exposure controlling operation, $$\begin{aligned} Tv &= Bv + Sv - Av \\ &= Bvo + Sv - (Av - Avo) \end{aligned} \quad (6)$$

From (5) and (6)

$$Tv = (1-\alpha)(Bvo + Sv + Avo) - \beta \quad (7)$$

A value of Tv is provisionally set in accordance with the above formula (7) and then the diaphragm is stopped down so as to satisfy the formula (4). In other words, a shutter speed is provisionally determined from the photo receptor output at minimum aperture value, ASA speed value and minimum aperture value. Then, the diaphragm is moved to stop down the aperture until the determined value and the photo receptor output at the time of stopping down obtained from the ASA speed value become just equal to each other.

For this exposure control, as readily seen from the above formula (7), an incorrect value will result from vignetting if the information signal be transmitted in the manner indicated by the phantom line in FIG. 2. The value of shutter speed obtained in this case will be shifted toward the low speed side to the extent corresponding to the reduction of light caused by vignetting.

To solve the problem, according to the shown embodiment, there is provided a stopper pin 26 for an intermediate lens tube which brings about a vignetting phenomenon when connected with an interchangeable lens. The stopper pin 26 serves to limit the range of rotational movement of the second transmission member.

By way of example it is assumed that the rear conversion lens L2 causes vignetting by its own lens tube when an interchangeable lens L1 having a smaller minimum F-number than F 2 is connected with the rear conversion lens. In this case, the stopper pin 26 stops the transmission member 24 at the position of F 2 as indicated by the solid line in FIG. 2. The pin 26 prevents the transmission member from further moving beyond the limit set at the position of F 2. Therefore, the lowest limit of minimum F-number which the transmission member 24 can transmit to the camera body is F 2 in this case. For all of those interchangeable lenses which have a minimum F-number less than F 2, for example, those which are F 1.4 in minimum F-number, the transmission member 24 will transmit always information of F 2 to the detection member 32 on the camera body. This means that the transmission member 24 stopped by the pin 26 bears information of $Avo' + Avo \cdot v$ wherein $Avo'$ is the minimum diaphragm value of an interchangeable lens then mounted. Therefore, in the case of shutter speed priority exposure control by instantaneous stop-down photometering, the above formula (3) becomes:

$$Av = Bvo + Sv - Tv + Avo' + Avo \cdot v \qquad (8)$$

Since the proper aperture value is calculated receiving $Avo' + Avo \cdot v$ from the transmission member 24, the value Av given by the equation (8) means the aperture value of the interchangeable lens L1 is automatically controlled and therefore the camera can indicate always a correct aperture value.

For automatic diaphragm control, the same procedure as above is carried out to satisfy the formula (4). In the case of programmed automatic exposure control, also a correct value can be obtained and an actually controlled aperture value of the interchangeable lens can be indicated for the same reason.

A rear conversion lens has an effect to convert focal length as previously mentioned. Therefore, the minimum F-number of an interchangeable lens L1 is subjected to a substantial change when mounted to the rear conversion lens. Employing another embodiment shown in FIG. 3, this problem of change in minimum F-number can be solved without difficulty.

Figure 3:
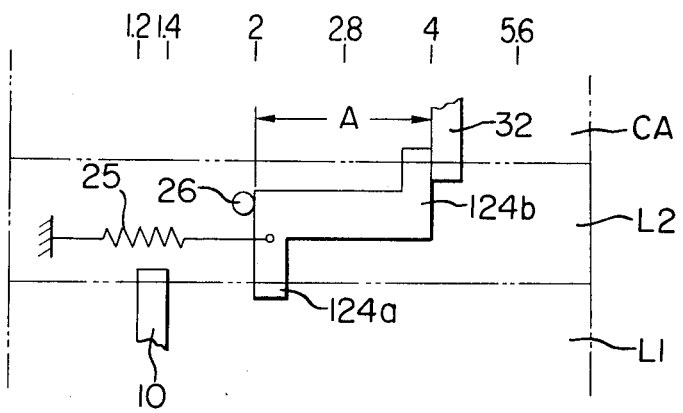
FIG. 3 is a view similar to FIG. 2 showing another embodiment of the invention.

In FIG. 3, the same reference numerals and characters as those in FIG. 2 designate the same members and parts. 124 is an information transmission member. The rear conversion lens L2, like that shown in FIG. 2, causes some vignetting (corresponding to $Avo \cdot v = 1$ EV) when a lens having a smaller minimum F-number than F 2 is used. The lens L2 also has a magnifying power of $\times 2$.

The interchangeable lens L1 may be considered to be darkened by the rear conversion lens L2 to the extent corresponding to $Avo \cdot f = 2$ EV. In this embodiment, therefore, the output terminal 124b of the transmission member 124 is positioned shifted relative to its input terminal 124a by a distance corresponding to 2 EV. Namely, the transmission member 124 transmits the really existing effective F-number to the camera body. Thus, when an interchangeable lens of F 1.4 is mounted, as shown in FIG. 3, information of F 4 is transmitted to the camera body CA through the transmission member 124.

In this case, the information which is transmitted to the detection member 32 on the camera body through the transmission member 124 is $Avo' + Avo \cdot v + Avo \cdot f$. Consequently, the above formula (3) becomes:

$$Av = Bvo + Sv - Tv + Avo' + Avo \cdot v + Avo \cdot f \qquad (9)$$

Therefore, it is made possible to indicate a proper aperture value obtained depending upon the effective F-number of the total system consisting of an interchangeable lens L1 and a rear conversion lens L2. This is of great advantage, for example, to calculate the guide number when a picture at a near object distance must be taken using a flush light apparatus. Since the proper aperture value based on the effective F-number of the total lens system is made known to the operator, he can very easily calculate the proper quantity of flash light then required.

While the invention has been particularly shown and described with reference to preferred embodiments thereof, it will be understood by those skilled in the art that the foregoing and other changes in form and details can be made therein without departing from the spirit and scope of the invention.

We claim

1. In an intermediate lens tube mountable between an interchangeable lens having on the mount thereof means for generating a signal of minimum F-number and a camera having means for detecting said signal on the mount thereof on which said interchangeable lens is mountable and including a circuit for receiving said detected signal and an output derived from the light passed through said interchangeable lens and effecting an exposure operation and which causes vignetting during connection with said interchangeable lens having a minimum F-number smaller than a certain critical minimum F-number, the improvement comprising:

transmission means capable of being coupled to each of said signal generating means and to said detection means during said mounting, said transmission means including correction means for transmitting to said detection means a signal corresponding to said critical minimum F-number only when said minimum F-number signal issued from said signal generating means is smaller than said critical minimum F-number.

2. An intermediate lens tube as set forth in claim 1 wherein said correction means includes means for preventing said transmission means from operating in response to the signal from said signal generating means when said signal is one informing of a minimum F-number smaller than said critical minimum F-number.

3. In an intermediate lens tube as set forth in claim 1, in which said signal generating means represents said minimum F-number signal as a positional signal, wherein said transmission means comprises a transmission member displaceable by a distance corresponding to said positional signal and a stopper member for blocking the movement of said transmission member only for the positional signal informing of a minimum F-number smaller than said critical minimum F-number.

4. In a combination as set forth in claim 3, said detection means comprises a detecting member connectable with said signal generating means by an operation for mounting said interchangeable lens to said camera and displaceable up to a position indicated by said positional signal.

5. In a combination as set forth in claim 4, in which said signal generating means comprises a signal member having an engaging portion at a position shifted in circumferential direction by a predetermined amount from the reference position on the mount of said interchangeable lens, wherein said transmission member is displaceable in circumferential direction and has an input portion engageable with the engaging portion of said signal member and an output portion engageable with said detecting member.

6. An intermediate lens tube as set forth in claim 1 wherein said transmission means is so disposed as to shift the signal given by said signal generating means in an amount corresponding to the difference between the minimum F-number of said interchangeable lens and the minimum F-number resulting from the combination of said interchangeable lens and intermediate lens tube and to transmit said shifted signal to said detection means.

* * * * *

UNITED STATES PATENT AND TRADEMARK OFFICE
CERTIFICATE OF CORRECTION

PATENT NO. : 4,326,788
DATED : April 27, 1982
INVENTOR(S) : SACHIO OHMORI, ET AL.

It is certified that error appears in the above—identified patent and that said Letters Patent is hereby corrected as shown below:

Column 8, line 15, delete "positioned";
          line 36, "flush" should be --flash--;
          line 60, "couplied" should be --coupled--.

Signed and Sealed this

Thirteenth Day of July 1982

[SEAL]

Attest:

GERALD J. MOSSINGHOFF

Attesting Officer     Commissioner of Patents and Trademarks